US008266516B2

(12) United States Patent
Hiroi et al.

(10) Patent No.: US 8,266,516 B2
(45) Date of Patent: Sep. 11, 2012

(54) CONTROLLER

(75) Inventors: Makoto Hiroi, Hamamatsu (JP); Satoshi Takemura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1179 days.

(21) Appl. No.: 11/522,259

(22) Filed: Sep. 14, 2006

(65) Prior Publication Data

US 2007/0067731 A1 Mar. 22, 2007

(30) Foreign Application Priority Data

Sep. 16, 2005 (JP) ................................ 2005-270481
Sep. 16, 2005 (JP) ................................ 2005-270584

(51) Int. Cl.
*G06F 17/00* (2006.01)

(52) U.S. Cl. ........ 715/211; 715/727; 715/765; 715/763; 715/771; 345/619; 345/661; 345/650

(58) Field of Classification Search .................. 715/765, 715/727, 763, 211, 771; 345/619, 661, 650
See application file for complete search history.

(56) References Cited

U.S. PATENT DOCUMENTS 5,481,741 A * 1/1996 McKaskle et al. ............ 345/522
6,687,891 B2 2/2004 Abe
6,954,904 B2 * 10/2005 White .......................... 715/763
7,031,479 B2 * 4/2006 Eastty et al. .................. 381/119
7,062,719 B2 * 6/2006 Zirojevic et al. .............. 715/771
7,184,560 B2 * 2/2007 Ajamian ....................... 381/119
7,603,481 B2 * 10/2009 Carter .......................... 709/240
7,703,027 B2 * 4/2010 Hsu et al. ...................... 715/763
2003/0025734 A1 * 2/2003 Boose et al. .................. 345/765
2005/0155015 A1 * 7/2005 Novacek ....................... 717/105
2006/0026560 A1 * 2/2006 Kornerup et al. ............. 717/113
2010/0223564 A1 * 9/2010 Hsu et al. ...................... 715/763

FOREIGN PATENT DOCUMENTS

JP 05-002617 A 1/1993
JP 06-251108 A 9/1994
JP 2000-276516 A 10/2000
JP 2001-331541 A 11/2001

OTHER PUBLICATIONS

Active_Cad, Schematic Editor User's Guide, 1996, ALDEC, Seventh Edition, pp. 2-26, 4-21, 5-25.*
DME Designer Version 1.2 Owner's Manual, by Yamaha Corporation, Japan.
ALDEC. (Jan. 15, 1996). Active-CAD™ Real-Time Interactive CAE Tools: Schematic Editor, User's Guide, Seventh Edition, Revision 2, 186 pages.
Notification of Reason(s) for Refusal mailed Apr. 20, 2010, for JP Patent Application No. 2005-270481, with English Translation, four pages.
Notification of Reason(s) for Refusal mailed Nov. 2, 2010, for JP Patent Application No. 2005-270481, with English Translation, four pages.

* cited by examiner

*Primary Examiner* — Cesar Paula
*Assistant Examiner* — David Faber
(74) *Attorney, Agent, or Firm* — Morrison & Foerster LLP

(57) ABSTRACT

A controller for controlling display on an edit screen for performing edit using components each having nodes and wires connecting the nodes is configured to add, when there is a direction to add a wire for connecting the nodes, a wire according to the direction and set a display style of the added wire to the display style corresponding to the display style set for the kind of the nodes on both sides; when there is a direction to change the display style for one of the kinds of the node, the controller changes the display style of the directed kind according to the direction, while not changing the display style of the wire; and when there is a direction to change the display style of the wire, the controller changes the display style of the directed wire according to the direction.

6 Claims, 9 Drawing Sheets

| KIND OF NODE | DISPLAY STYLE |
|---|---|
| Digital Audio | RED |
| Analog Audio | BLUE |
| Cascade | PURPLE |
| MIDI | GREEN |
| Ethernet | YELLOW |
| USB | LIGHT BLUE |
| Word Clock | YELLOWISH GREEN |
| ⋮ | ⋮ |

CONTROLLER

BACKGROUND OF THE INVENTION

1. Field of the Invention

The invention relates to a controller for controlling display on an edit screen for performing edit using components each having nodes and wires connecting the nodes, and a program for causing a computer to function as such a controller.

2. Description of the Related Art

Conventionally, there has been a known apparatus configured to be capable of performing edit using components each having nodes and wires connecting the nodes utilizing GUI (Graphical User Interface).

For example, Owner's Manual of "DME Designer (trade name) Version 1.0" available from YAMAHA Corporation describes that it is possible to edit the configuration of audio signal processing executed by a mixer engine having a programmable DSP (Digital Signal Processor) on a computer such as a PC (personal computer) or the like using components representing constituents of signal processing and wires connecting nodes of the components.

Further, the object of the edit is not limited to the contents of the audio signal processing executed by one mixer engine, but the state of connection between a plurality of mixer engines and so on can also be edited.

SUMMARY OF THE INVENTION

And now, according to the technique described in the aforementioned document, components in different colors can be placed on a color display screen to perform edit. Furthermore, colors and patterns can be designated also for wires. In addition, appropriately setting the colors and patterns allows the editing contents to be easily viewed.

However, setting a number of parts displayed on the screen one by one has a problem of requiring a large amount of labor. In particular, a large number of nodes of the components and wires connecting the nodes are placed on the screen and thus requires a large amount of labor for setting.

The invention solves such problems and its object is to make it possible to intuitively display nodes and wires using a plurality of display styles while maintaining the high operability, on an edit screen for performing edit using components each having nodes and wires connecting the nodes.

To achieve the above object, a controller of the present invention is a controller for controlling display on an edit screen for performing edit using components each having nodes and wires connecting the nodes, a plurality of kinds of nodes being used in the edit, the controller including: a first display controller that performs display of each of the nodes in a display style set for each of the kinds of the nodes; a second display controller that performs display of each of the wires in a display style set for each of the wires; a wire adder that adds, when there is a direction to add a wire for connecting the nodes, a wire according to the direction and sets a display style of the added wire to the display style corresponding to the display style set for the kind of the node to which the wire is connected; a first style changer that changes, when there is a direction to change the display style for one of the kinds of the nodes, the display style of the directed kind according to the direction, while not changing the display style of the wire; and a second style changer that changes, when there is a direction to change the display style of the wire, the display style of the directed wire according to the direction.

Further, the first style changer may be a device that changes, when there is a direction to change the display style for one of the kinds of the nodes, the display style of the directed kind according to the direction, and changes the display styles of the wires connected to the nodes of the directed kind and having display styles corresponding to the display styles of the connection destination nodes thereof, in conformity to the change at the nodes.

Further, it is preferable in the above-described controllers that the kinds of the nodes are made by classification depending on the kind of a signal inputted to/outputted from the node or the standard with which the node complies, and that the same setting contents about the display style set for each of the kinds of the nodes are applied to the nodes provided at all of the components.

Further, a memory that stores, for each of the displayed wires, wiring data including information on the display style of the wire may be provided, the second display controller may be a device that displays each of the wires based on the wiring data, and when there is the direction to add the wire, the wire adder may generate wiring data about the wire to be added.

Further, a controller of the invention is a controller for controlling display on an edit screen for performing edit using components each having nodes and wires connecting the nodes, a plurality of kinds of nodes being used in the edit, the controller including: a first display controller that performs display of each of the nodes in a display style set for each of the kinds of the nodes; a second display controller that performs display of each of the wires in a display style set for each of the wires; and a style changer that changes, when there is a direction to change the display style of the wire, the display style of the wire directed to be changed according to the direction, and changes the display style of the node to which the directed wire is connected to the display style corresponding to the display style of the wire after the change.

It is preferable that when the style changer changes the display style of the node to which the directed wire is connected, the style changer also changes the display styles of the wires connected to the nodes of the same kind as that of the node whose display style has been changed, according to the direction to change.

Further, it is preferable that the kinds of the nodes are made by classification depending on the kind of a signal inputted to/outputted from the node or the standard with which the node complies, and that the same setting contents about the display style set for each of the kinds of the nodes are applied to the nodes provided at all of the components.

Further, it is preferable that a memory is provided for storing, for each of the displayed wires, wiring data including information on the display style of the wire, that the second display controller is a device for displaying each of the wires based on the wiring data, and that when there is a direction to add the wire, the wire adder generates wiring data about the wire to be added.

Furthermore, the invention can be configured and carried out not only as an invention of an apparatus but also as an invention of a method. Further, the invention can be carried out in a form of a program for a processor of a computer or the like and also in a form of a memory storing such a program.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments for carrying out the invention will be concretely described with reference to the drawings.

A PC which is an embodiment of a controller of the invention will be described first.

Figure 1:
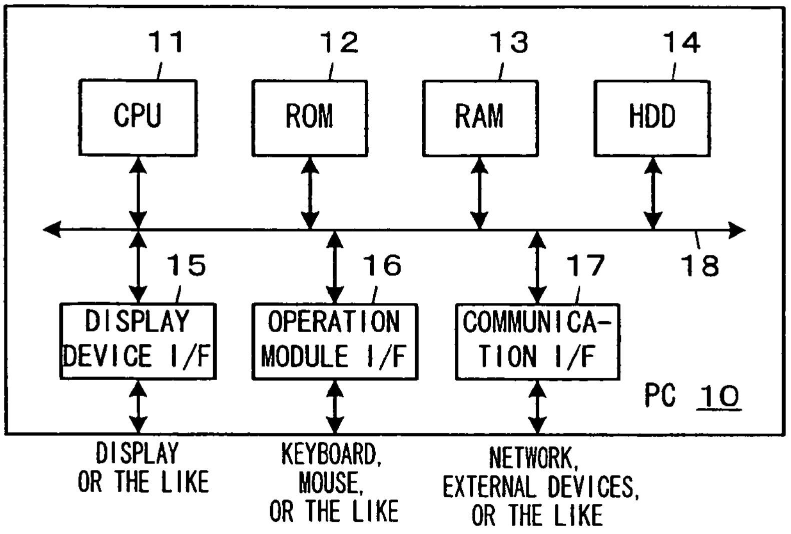
FIG. 1 is a block diagram showing the configuration of a PC being an embodiment of a controller of the invention.

FIG. 1 is a block diagram showing the configuration of the PC.

As shown in this drawing, a PC 10 comprises a CPU 11, a ROM 12, a RAM 13, an HDD (hard disk drive) 14, a display device I/F (interface) 15, an operation module I/F 16, and a communication I/F 17, which are connected by a system bus 18.

The CPU 11, which is a controller that comprehensively controls the operation of the PC 10, functions as various devices by executing required programs stored in the ROM 12 and the HDD 14 to perform various kinds of processing such as display control via the display device I/F 15, detection of operation via the control module I/F 16, control of communication via the communication I/F 17, and interior data processing.

The ROM 12 is a non-volatile memory that stores the programs executed by the CPU 11. The ROM 12 may employ a rewritable memory such as a flash memory or the like to allow updating of data.

The RAM 13 is a memory that is used as a work area of the CPU 11, into which contents of signal processing configuration to be edited by GUI such as a later-described edit screen or the like, and property data, preference data and so on used for display of the GUI are stored during edit.

The HDD 14, which is a large rewritable non-volatile memory, stores the programs executed by the CPU 11, edited data, and so on.

The display device I/F 15 is an interface for connecting a display devices such as a display or the like. The operation module I/F 16 is an interface for connecting a pointing device such as a keyboard, a mouse and the like, and other control modules for accepting operations from a user. Note that the display devices and the operation module may be included in the PC 10.

The communication I/F 17 is an I/F for communicating with external devices. For example, it is conceivable to provide an I/F complying with Ethernet (registered trademark) standard to allow connection to LAN (Local Area Network), or to provide an I/F complying with the USB (Universal Serial Bus) standard to allow direct connection of a mixer engine being a control target.

The PC 10 as described above may have a known configuration as hardware and thus can employ a PC on which an operating system (OS) such as Windows XP (registered trademark) can operate.

The PC 10 can execute the required programs to control various communicatable devices via the network or directly.

Figure 2:
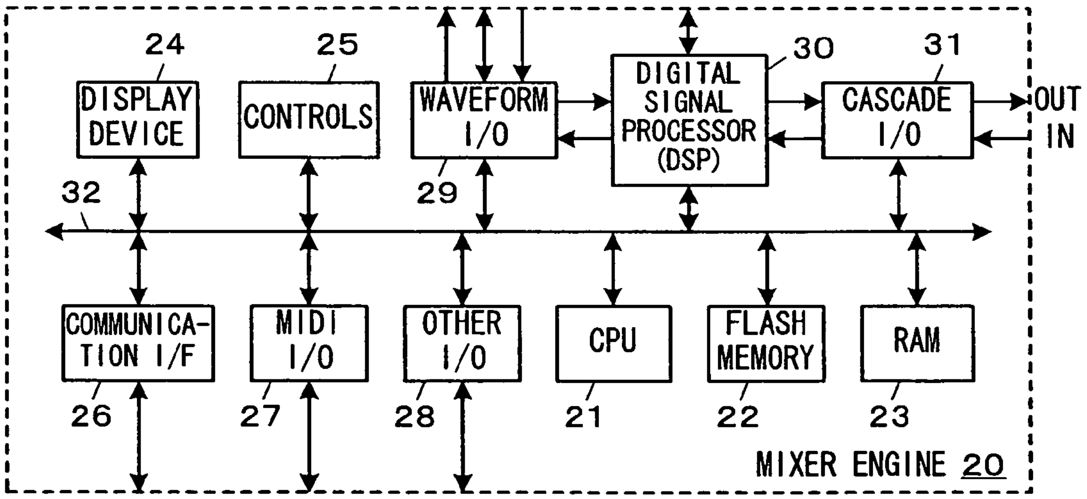
FIG. 2 is a block diagram showing the configuration of a mixer engine being one example of control objects of the PC shown in FIG. 1.

FIG. 2 shows a configuration of the mixer engine that is an example of the control target.

The mixer engine 20 comprises a CPU 21, a flash memory 22, a RAM 23, a display device 24, controls 25, a communication IF 26, a MIDI (Musical Instruments Digital Interface) I/O (input/output module) 27, other I/O 28, a waveform I/O 29, a digital signal processor (DSP) 30, and a cascade I/O 31, which are connected by a system bus 32.

The mixer engine 20 is an audio signal processor having a function such that the CPU 21 creates a micro-program for controlling the DSP 30, which is an audio signal processor capable of being programmed processing contents, according to the signal processing configuration received from the PC 10 to cause the DSP 30 to operate following the micro-program, to thereby performs various kinds of signal processing on inputted audio signals and output the processed audio signals.

Communication with the PC 10 is performed via the communication I/F 26, but may be performed via the network such as LAN, the Internet, or the like, or may be directly performed.

Further, input/output of audio signals can be performed via the waveform I/O 29 comprising audio input/output terminals capable of inputting/outputting digital or analog audio data or the cascade I/O 31 capable of transmitting/receiving audio data to/from other mixer engines as well as can be performed by communication via the network connected over the communication I/F 26. It is also possible that a plurality of mixer engines input/output audio signals between them to cooperatively perform audio signal processing.

Figure 3:
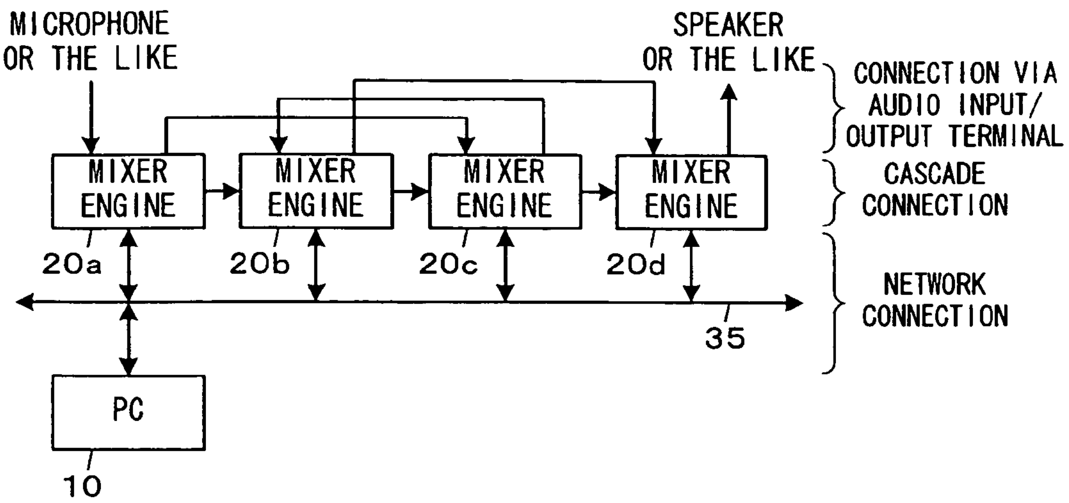
FIG. 3 is a diagram showing a configuration example of a mixer system composed of the PC shown in FIG. 1 and the mixer engine shown in FIG. 2.

FIG. 3 shows a configuration example of a mixer system composed of the above-described PC and the mixer engines that are the control targets thereof.

In the case where the PC 10 controls a plurality of mixer engines 20*a* to 20*d* to cause the mixer engines 20 to cooperatively perform signal processing, wiring is made so that the PC 10 can transfer to each of the mixer engines 20 data for control, including a signal processing configuration, and each of the mixer engines can input/output required audio signals.

One example of the wiring is shown in FIG. 3, in which example the PC 10 and the mixer engines 20 are connected via a network 35. The mixer engines 20 can receive the data for control including the signal processing configuration from the PC 10 via the network 35 as well as transmit/receive the audio signals to/from each other.

In the example in FIG. 3, however, another signal transmission/reception path is prepared, in addition to the network 35, by connecting the audio input/output terminals provided at the waveform I/Os 29 or the cascade I/Os 31 in respective mixer engines 20 via appropriate cables. Further, a signal input device such as a microphone for inputting audio signals to be processed and an audio output device such as a speaker or the like for performing output based on the processed audio signals are also connected to some of the mixer engines 20.

In the above-described mixer system, the PC 10 transmits and sets an appropriate signal processing configuration to respective mixer engines 20 to cause the mixer engines 20 to cooperatively process the audio signals inputted through the microphone or the like and to output to the speaker or the like.

Figure 4:
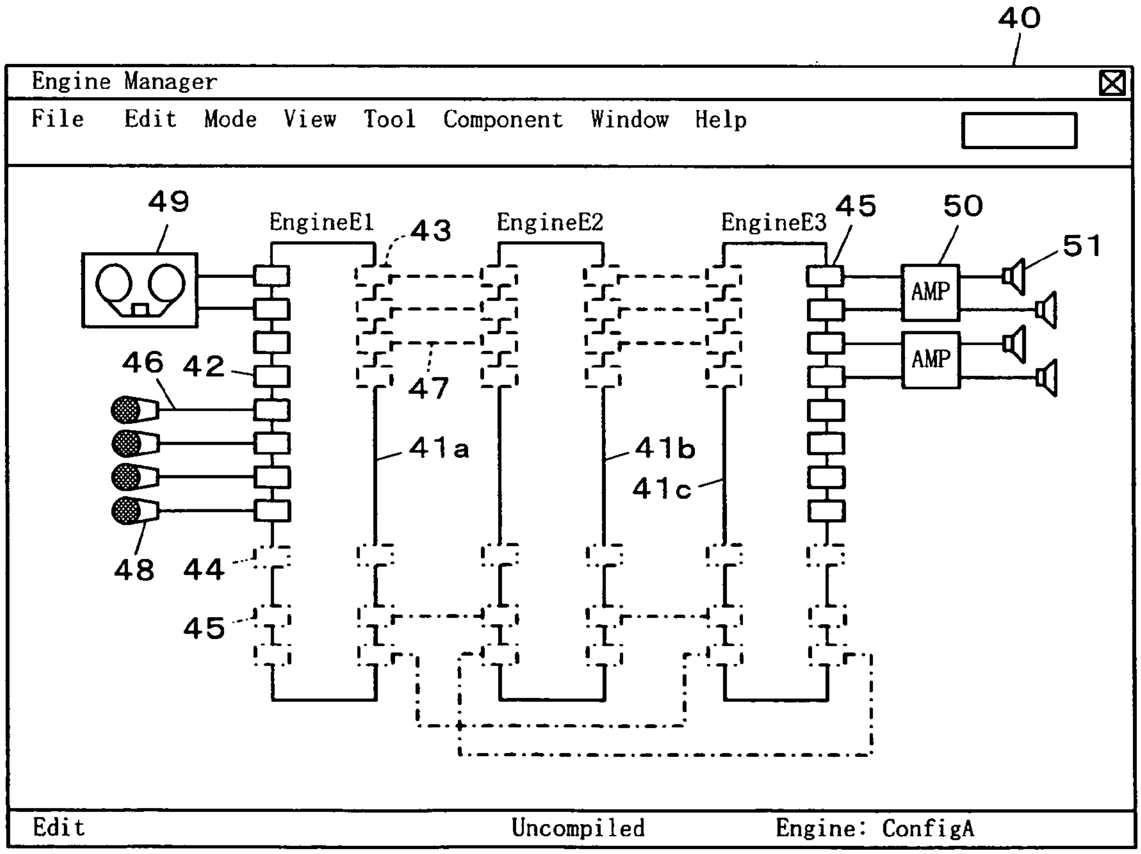
FIG. 4 is a diagram showing an example of an edit screen of a signal processing configuration displayed on a display of the PC shown in FIG. 1.

Next, an editing scheme of the signal processing configuration in the PC 10 will be described. FIG. 4 is a diagram showing an example of an edit screen of a signal processing configuration displayed on the display of the PC 10.

When the user causes the PC 10 to execute the edit program for implementing the function of editing the signal processing configuration, the PC 10 causes the display to display a CAD (Computer Aided Design) screen 40 as shown in FIG. 4 to accept an edit direction from the user.

In this screen, the editing contents are graphically displayed by components (41*a* and so on) representing components of signal processing and wires (47 and so on) connecting input nodes and output nodes (42, 43 and so on) of the components. Note that the nodes displayed on the left side of the components are the input nodes, and the nodes displayed on the right side are the output nodes.

The editing contents of the signal processing configuration include those associated with the configuration of signal processing inside the mixer engine 20 executed by the DSP 30 of each mixer engine 20, and those associated with the configuration of the mixer engine 20 itself and the external part thereof. The latter include setting of the model type of mixer engine prepared in the system and the kinds of options to be installed, the external device connected to the mixer engine, the connecting state of the cables connecting the devices and so on, and determine the preconditions when editing the configuration of the signal processing in the mixer engine 20.

FIG. 4 shows a screen for editing the configuration of the latter external configuration.

In this screen, one mixer engine 20 is represented by each one of the mixer components 41*a* to 41*c*, and nodes 42 to 45 corresponding to the model type or options (input/output boards and so on) set by the user are displayed at each of the mixer components 41*a* to 41*c*.

Note that the nodes are classified into a plurality of kinds according to the kinds of inputted/outputted signals, the standards of the nodes or the like, and analogue audio terminal nodes 42, digital audio terminal nodes 43, cascade terminal nodes 44, network (Ethernet) terminal nodes 45 are displayed here. Further, kinds for classification are also prepared, in addition to the above, such as MIDI terminal nodes, USB terminal nodes, clock terminal nodes and so on, but not shown here.

Furthermore, the display style of color, shape, the thickness and pattern of a contour line can be set for each kind of the nodes. As an example, the analogue audio terminal nodes 42 are represented by a solid line, the digital audio terminal nodes 43 by a broken line, the cascade terminal nodes 44 by a two-dotted chain line, and the network terminal nodes 45 by a one-dotted chain line, but not limited to those. In addition, it is not always necessary that the display style differs for each kind, but the same display style may be used for the different kinds.

Further, the display style such as the color, thickness, pattern and so on can be set for each of the wires connecting the nodes, and a wire 46 is represented here by a solid line and a wire 47 by a broken line as examples. Also for the wires, the same display style may be used for different wires. The display styles of the nodes and the display styles of the wires can be basically independently set.

Further, a microphone symbol 48, a deck symbol 49, an amplifier symbol 50, and a speaker symbol 51 can also be displayed on the CAD screen 40 as components showing other than the mixer engines 20, and those components also have nodes to which wires can be connected though their illustration is omitted.

The basic configuration for performing edit using components having respective nodes and wires connecting the nodes on the screen for editing the configuration of signal processing in the mixer engine 20 is the same as that in the case of the above-described CAD screen 40. The units of the signal processing such as a filter, a mixer, and a compressor are components.

By directing execution of “Save” in a “File” menu, the result of edit on the CAD screen 40 as described above can be saved as configuration (config) data. Further, by directing execution of “Compile” in the “File” menu, the data format of a part of the configuration data can be converted into the data format for the mixer engine, and then the resultant data can also be transferred to and stored in the mixer engine 20 as a signal processing configuration.

This embodiment has a feature in the method of setting the display styles of the nodes and wires displayed on the above-described edit screen. Hence, this point will be described hereinafter.

First, the configuration of a part of the data used for the PC 10 to display the edit screen associated with the setting of the display styles of the nodes and wires will be described.

Figure 5:
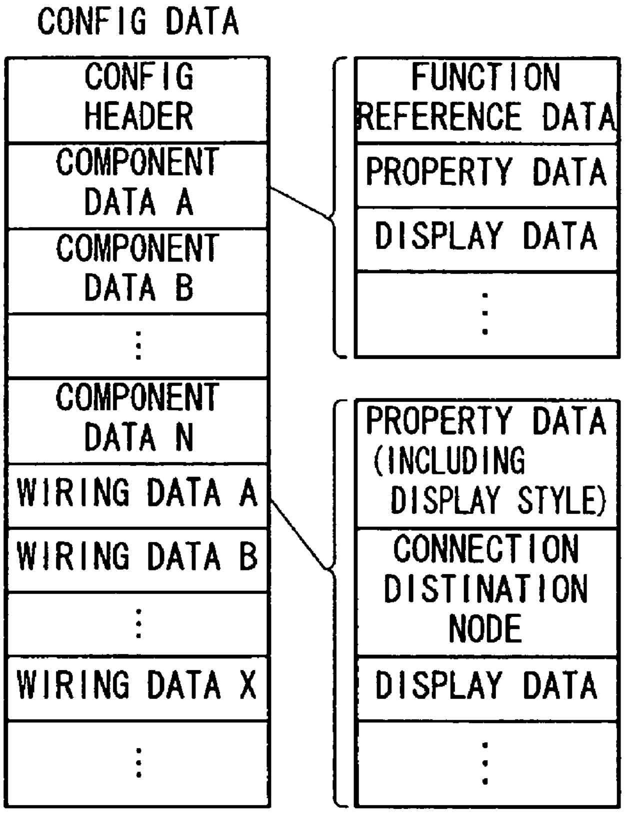
FIG. 5 is an illustration showing the storage state of data on display styles of wires in the PC shown in FIG. 1.
Figure 6:
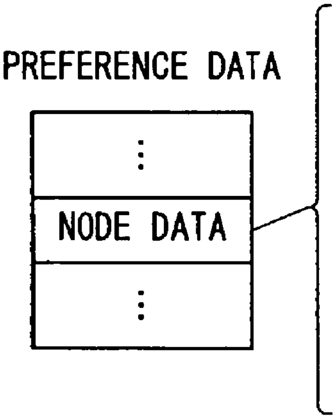
FIG. 6 is an illustration showing the storage state of data on display styles of nodes in the same PC.

FIG. 5 and FIG. 6 are illustrations showing the storage states of the data on the display styles of the wires and nodes, respectively.

When executing the above-described edit program to start edit of the signal processing configuration, the PC 10 generates configuration data as shown in FIG. 5 as data showing the contents of the signal processing configuration during edit. The configuration data includes component data indicating characteristics of components included in the signal processing configuration and wiring data indicating characteristics of each wire.

Each piece of component data of the above data includes function reference data for referring to not-shown preset component data defining the form of the component, property data defining the presence or absence of options about the component or the kinds and number of the input/output nodes and defining the display style of the component main body (other than the nodes), and display data indicating the position where the component is disposed on the edit screen and the like.

The kind is defined for each of the nodes provided at the component as described above, and which node belongs to what kind can be found by referring to the preset component data based on the property data and function reference data.

Note that the data showing the display style of the node is not included either in the component data or the preset component data.

Further, each piece of wiring data includes property data indicating the display style of the wire, connection destination node data indicating the node to which the wire is connected, and display data indicating information on the position where the wire is disposed on the edit screen, the point which the wire passes, and so on.

In other words, the data indicating the display style of the wire is prepared for each wire so that the display style can be independently set for each wire. Further, the display style of the wire can be changed by selecting the wire on the CAD screen 40, giving a direction to open a property setting screen to open a not-shown property setting screen associated with the selected wire, and giving a direction to make a change on the screen.

Further, when executing the edit program, the PC 10 reads out preference data as shown in FIG. 6 stored in the HDD 14 as data defining the operation of the whole program, such as the display format of the edit screen, the acquisition source and the storage destination of data, and so on to reflect the data in the operation based on the edit program.

The preference data includes node data defining the display styles of the nodes provided at the components displayed on the CAD screen 40. The node data defines the display styles about the nodes of all kinds which the component can include, on a basis of one display style for each kind such as a digital audio terminal node, an analogue audio terminal node or the like.

The contents of the same node data are applied to all of the components displayed on all of the edit screens. Thus, when the setting of the display style on a certain kind is changed, the display styles of the nodes of the same kind are changed for all of the components within all of the edit screens. The reason why the above configuration is made is that the nodes of the same kind are usually connected to each other and thus it is more strongly required to identify the kind of the node rather than the discrete node.

Note that the node data shown in FIG. 6 defines a color displayed for each kind of node, in which case default values are used for not-defined thickness and pattern of the contour line, and so on. As a matter of course, in place of or in addition to the color, other items of the display style may be defined by the node data.

Further, the preference data including the node data can be changed by selecting "Preference" in the "File" menu on the CAD screen 40 to open the preference setting screen, and giving a direction to make a change on the screen.

Next, concrete processing associated with the setting of the display style executed by the CPU 11 of the PC 10 executing the edit program will be described. Note that the case where the color of the items of the display style is set or changed will be described as an example, but other items of the display style can be similarly handled as a matter of course.

Figure 7:
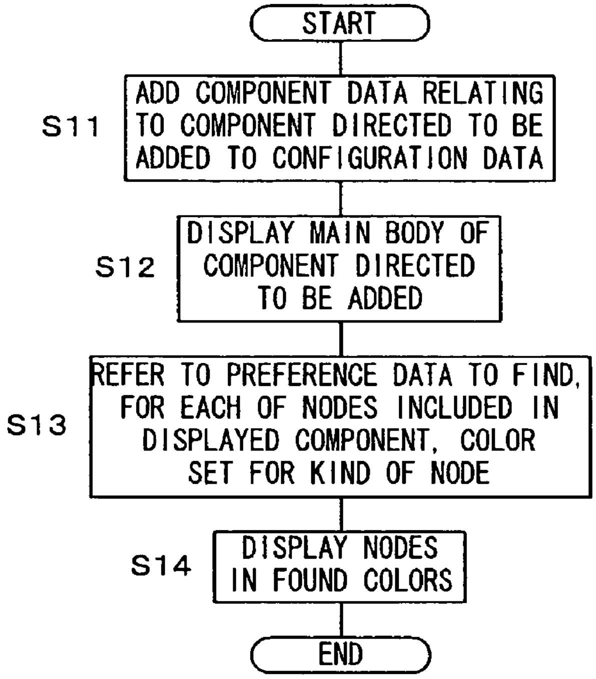
FIG. 7 is a flowchart of processing executed by a CPU of the PC shown in FIG. 1 when there is a direction to add a component on the edit screen.

First of all, a flowchart of processing when there is a direction to add a component on the edit screen such as the CAD screen 40 or the like is shown in FIG. 7.

When directed to add a component on the edit screen, the CPU 11 starts the processing shown in the flowchart in FIG. 7. Then, the CPU 11 first adds component data relating to the component, which the CPU 11 is directed to add, to the configuration data relating to the signal processing configuration during edit (S 11), and displays the main body of the component according to its component data (S 12).

The CPU 11 then refers to the preference data to find, for each of nodes included in the displayed component, the color set for the kind of the node (S13), and displays the nodes in the found colors (S14) and then ends the processing.

In the above processing, in steps S13 and S14, the CPU 11 functions as a first display controller. Besides, the above processing allows each of the nodes of the newly added component to be displayed in the color which is set for each kind of the nodes.

Figure 8:
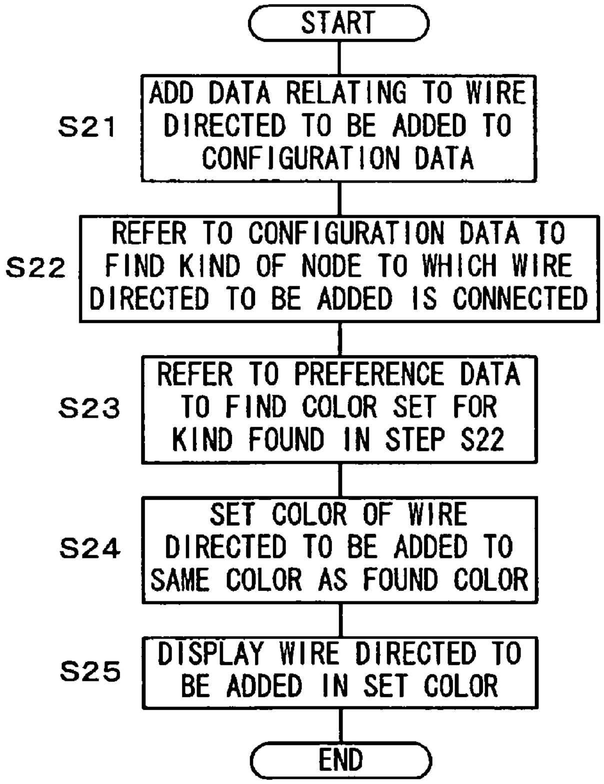
FIG. 8 is a flowchart of processing executed by the same PC when there is a direction to add a wire on the edit screen.

Next, a flowchart of processing when there is a direction to add a wire on the edit screen is shown in FIG. 8.

When directed to add a wire on the edit screen with the node(s) on both sides or one side being designated, the CPU 11 starts the processing shown in the flowchart in FIG. 8. Then, the CPU 11 first adds wiring data relating to the wire, which the CPU 11 is directed to add, to the configuration data relating to the signal processing configuration during edit (S21).

The CPU 11 then refers to the configuration data to find the kind of the node to which the wire that the CPU 11 is directed to add is connected (S22), and refers to the preference data to find the color set for the kind found in step S22 (S23). The CPU 11 then sets the color of the wire that the CPU 11 is directed to add into the same color as that found in step S23 and records it in the wiring data relating to that wire (S24), and displays the wire that the CPU 11 is directed to add in the set color and ends the processing (S25).

In the above processing, the CPU 11 functions as a wire adder and also functions as a second display controller in step S25.

Further, the above processing ensures that when a new wire is added, the color of the wire can be automatically set to be the same color as that of its connection destination node to make an intuitive display by a simple operation.

Note that when the CPU 11 is directed to add a wire with the nodes on both sides being designated and if the kinds of the nodes on both sides are different, it is preferable for the CPU 11 to give a warning of the difference, set a color indicating a warning at the wire, set a color in conformity to one of the nodes while displaying the wire in a color indicating a warning, or the like. This is because such addition of a wire is not usually performed.

Next, three patterns of the processing when the colors of the wires and the nodes are changed will be described as first to third operation examples.

FIRST OPERATION EXAMPLE

FIG. 9 and FIG. 10

Figure 9:
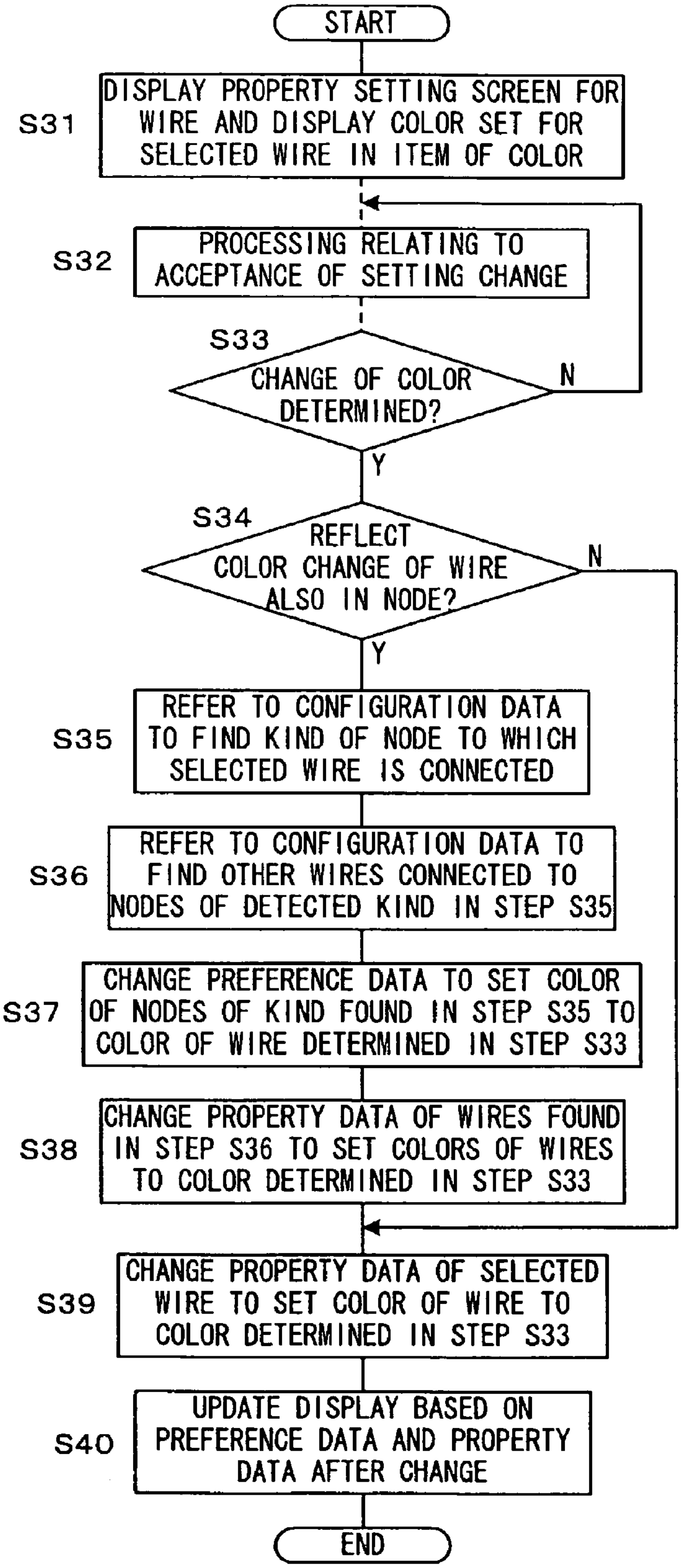
FIG. 9 is a flowchart of processing executed by the same PC when the color of a wire is changed in the first operation example.

FIG. 9 shows a flowchart of processing when the color of a wire is changed in the first operation example.

In the first operation example, when a wire is selected and the CPU 11 is directed to display the property setting screen for the wire, the CPU 11 starts the processing shown in the flowchart in FIG. 9. The CPU 11 pop-up displays the property setting screen for the wire and displays the color set for the selected wire in the item of color (S31). Thereafter, the CPU 11 performs processing relating to acceptance of the setting change in the property according to the user operation (S32), and when detecting an operation of determining the change of color (S33), the CPU 11 proceeds to the processing relating to the color change in and after step S34. Note that the processing in step S32 includes processing of closing the screen without changing the property when the change is cancelled.

In and after step S34, the CPU 11 first judges whether or not there is setting to reflect the color change of the wire also in the node (S34). The contents of the setting may be set as a part of the preference data or another option.

In the case of reflecting the change, the CPU 11 refers to the configuration data to find the kind of the node to which the selected wire is connected (S35), and refers to the configuration data to find other wires which are connected to the nodes of the found kind (S36). The CPU 11 changes the preference data to set the color of the nodes of the kind found in step S35 to the color of the wire determined in step S33 (S37), and changes the property data of the wires found in step S36 to set the colors of the wires to the color determined in step S33 (S38).

Then, the CPU 11 changes the property data of the selected wire (for which operation of property change has been made) to set the color of the wire to the color determined in step S33 (S39), and updates the display based on the preference data and the property data after the change made by the processing to this step (S40), and ends the processing.

In the case of NO in step S34, the CPU 11 immediately proceeds to step S39 to perform the processing thereafter.

In the above processing, the CPU 11 functions as a style changer and functions also as the first and second display controllers in step S40.

Further, with the above processing, operation of color change is performed for one wire whose color is desired to be changed, whereby all of the colors of the node to which the wire is connected, of nodes of the same kind as the node, and of other wires connected to the nodes of the same kind can be changed to the same color designated. There often is a request to display the nodes and wires within the above range in the same color, and the above-described processing allows display according to such a request to be performed by intuitive, straightforward and few operations.

Besides, when it is desired to change the color of a node, the operation of grasping the name of the kind of the node, then opening the preference setting screen for performing the whole setting, looking for the name of the target kind in the screen, and designating a new color requires a little labor. However, with the above-described processing, the color setting operation in the property screen showing the clear correspondence to the wire being the setting object can also set the color of the node as a result, thus reducing the load of the operation relating to the color setting of the node.

Further, it can be set whether or not the effect of the operation of color change is exerted on other than the directed wire, which can also deal with the request not to change the setting of color more than necessary.

Note that, in addition to whether or not the change of the color of the wire is reflected also in the node, it is adoptable to make it possible not to perform or to independently set the processing in steps S36 and S38, that is, whether or not to change the colors of other wires. This is because there is a practice of separating colors of cables for each channel among users, and there also is a request to display even the wires connected to the same kind of nodes in different colors in correspondence with the colors or markings or the like attached to the cables.

Further, a mode may be provided in which the processing in steps S35 to S38 other than in step S37 is performed. More specifically, it is adoptable to make it possible to change only the colors of the wires without changing the color of the nodes. This is because there also is a request to separately set the colors of the wires and the nodes, while keeping the uniformity of the colors of the wires connected to the nodes of the same kind.

Figure 10:
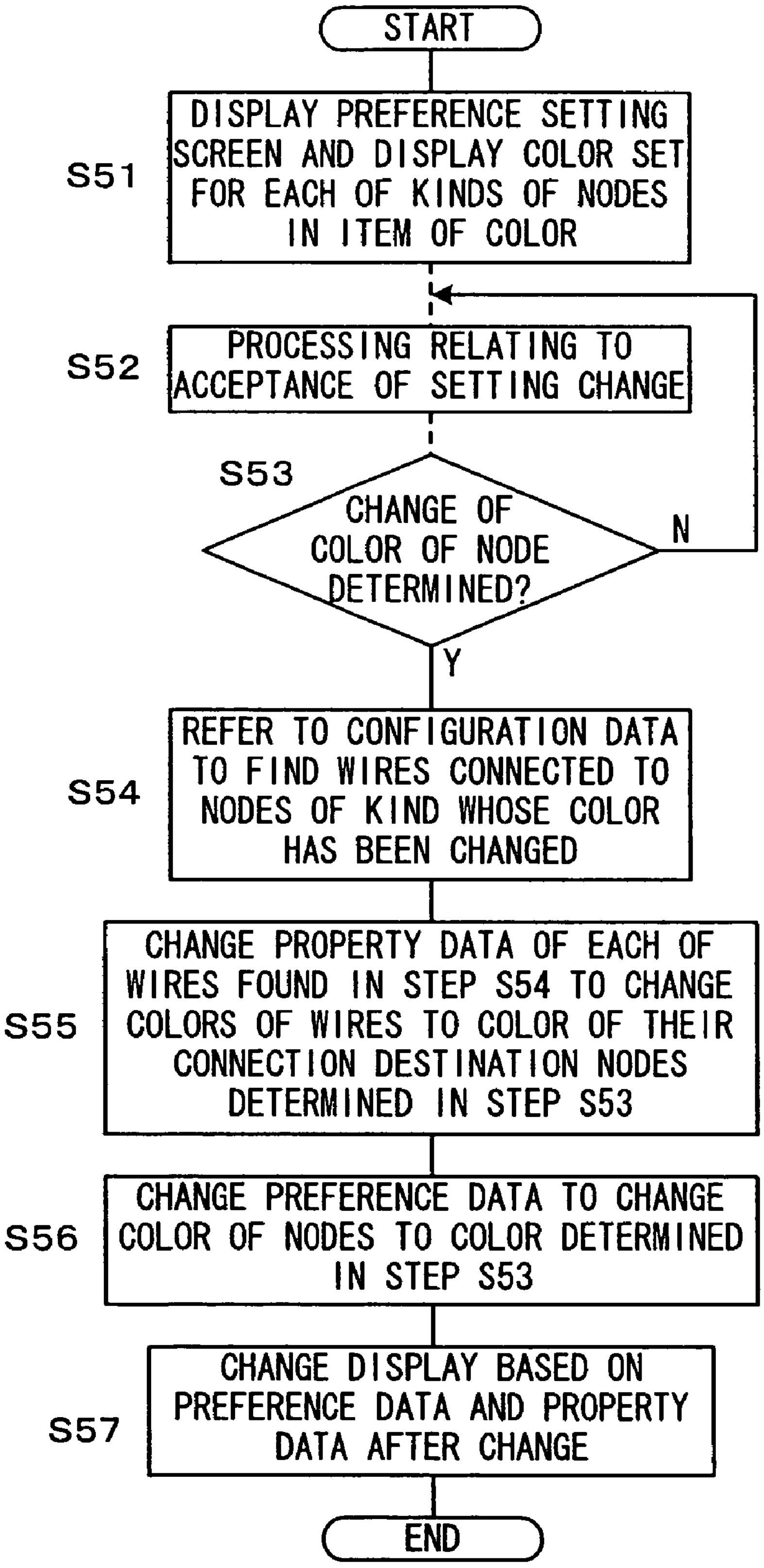
FIG. 10 is a flowchart of processing executed by the same PC when the color of a node is changed in the first operation example.

Next, a flowchart of processing when the color of a node is changed in the first operation example is shown in FIG. 10.

In the first operation example, when directed to display the preference setting screen, the CPU 11 starts the processing shown in the flowchart in FIG. 10. Then, the CPU 11 first pop-up displays the preference setting screen to display the color set for each of the kinds of nodes in the item of color (S51). The CPU 11 then performs processing relating to acceptance of the setting change in the preference according to the user operation (S52), and when detecting an operation of determining the change of the color of a node (S53), the CPU 11 proceeds to the processing relating to the color change of the node in and after step S54. Note that the processing in step S52 includes processing of closing the screen without changing the preference when the change is cancelled.

In and after step S54, the CPU 11 first refers to the configuration data to find wires connected to nodes of the kind whose color has been changed (S54), and changes the property data of each of the found wires to change the colors of the wires to the color of their connection destination nodes which has been determined in step S53 (S55). Thereafter, the CPU 11 changes the preference data to change the color of the nodes to the color determined in step S53 (S56), and changes the display based on the preference data and the property data after the change made by the processing to this step (S57) and ends the processing.

In the above processing, the CPU 11 functions as the first and second display controllers in step S57.

Further, with the above-described processing, only by performing the operation of changing the color of nodes of the kind whose color is desired to be changed, the colors of all of the wires connected to the nodes of that kind can be changed to the designated same color. Thus, there often is a request to match the colors of a node and wires connected to that node, and the above-described processing allows the color change satisfying such a request to be performed by intuitive, straightforward and few operations.

Note that it is also adoptable to allow the user to set whether or not to perform the processing in steps S54 and S55, that is, whether or not to change also the colors of the wires in conformity to the color change of the node.

SECOND OPERATION EXAMPLE

FIG. 11, FIG. 12

Figure 11:
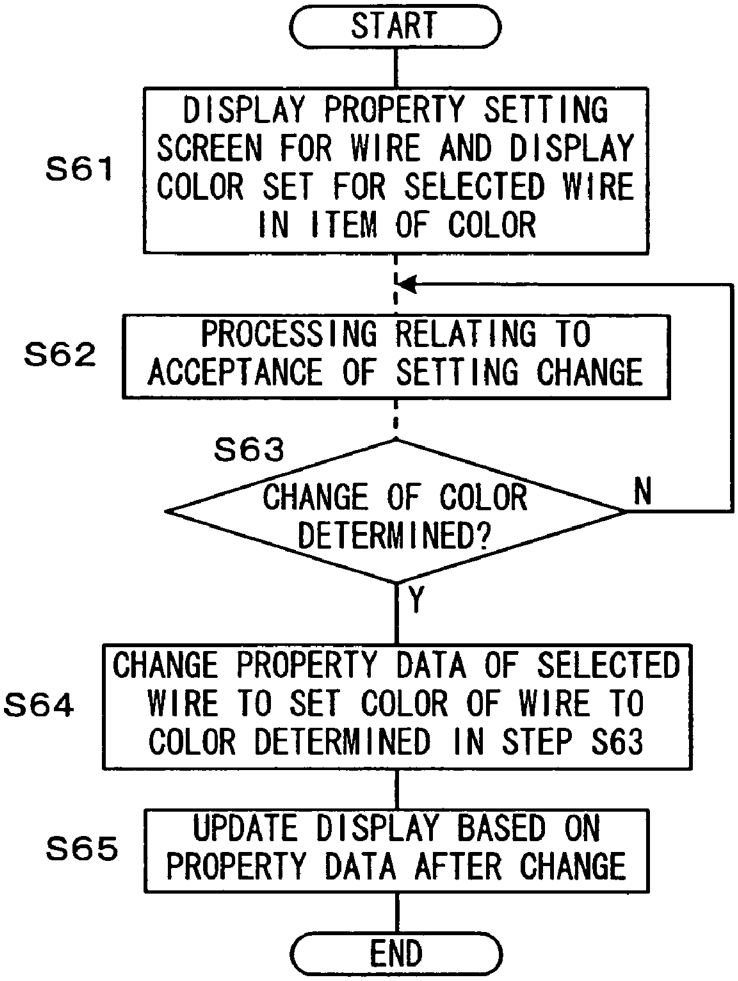
FIG. 11 is a flowchart of processing executed by the same PC when the color of a wire is changed in the second operation example.

Next, a flowchart of processing when the color of a wire is changed in the second operation example is shown in FIG. 11.

In the second operation example, when a wire is selected and the CPU 11 is directed to display the property setting screen for the wire, the CPU 11 starts the processing shown in the flowchart in FIG. 11. Then, as in the case of the steps S31 to S33 in FIG. 9, the CPU 11 pop-up displays the property setting screen, and accepts the setting change in the property, and when detecting an operation of determining the change of color, the CPU 11 proceeds to the process relating to the color change of the wire in and after step S64 (S61 to S63).

In this process, the CPU 11 changes the property data of the selected wire (for which operation of property change has been made) to set the color of the wire to the color determined in step S63 (S64), and updates the display based on the changed property data (S65) and ends the processing.

In the above processing, the CPU 11 functions as the second style changer, and further functions as the second display controller in step S 65.

Figure 12:
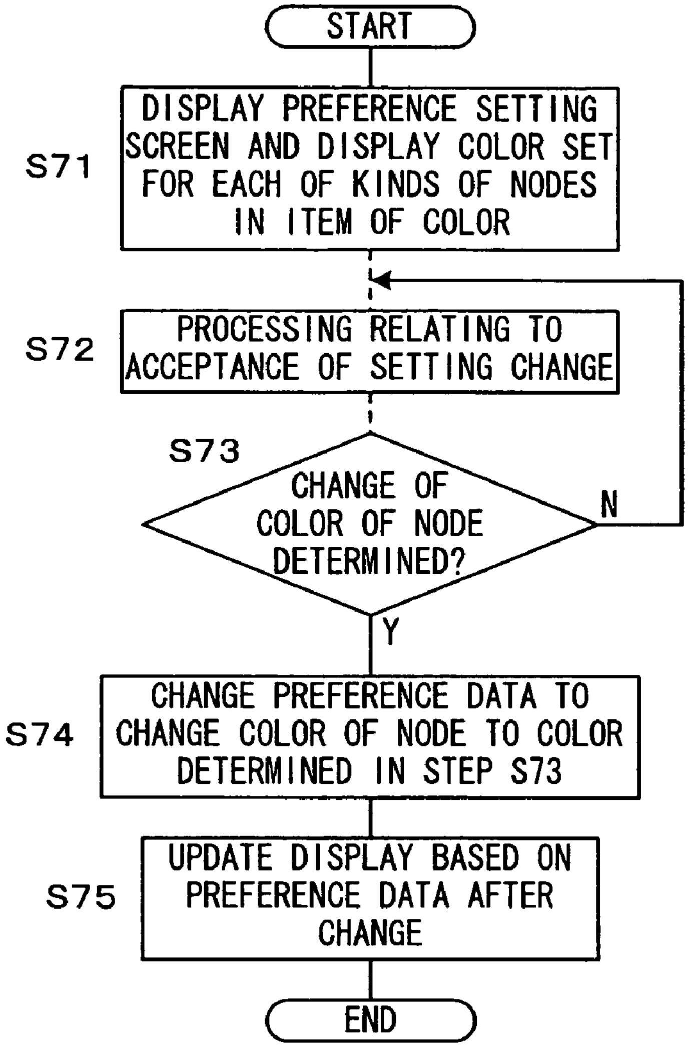
FIG. 12 is a flowchart of processing executed by the same PC when the color of a node is changed in the second operation example.

Further, a flowchart of processing when the color of a node is changed in the second operation example is shown in FIG. 12.

In the second operation example, when directed to display the preference setting screen, the CPU 11 starts the processing shown in the flowchart in FIG. 12. Then, the CPU 11 pop-up displays the preference setting screen as in the steps S51 to S53 in FIG. 10, and accepts the setting change in the preference, and when detecting an operation of determining the change of the color of a node, the CPU 11 proceeds to the processing relating to color change of the node after step S74 (S71 to S73).

In this processing, the CPU 11 then changes the preference data to change the color of the node to the color determined in step S73 (S74), and updates the display based on the preference data after the change made by the processing to this step (S75) and ends the processing.

In the above processing, the CPU 11 functions as the first style changer, and further functions as the first display controller in step S75.

In the second operation example, the color of the wire is not changed when there is a direction to change the color for each kind of nodes, and the color of the node is not changed when there is a direction to change the color of a wire.

This configuration ensures that the color of a wire, when newly placed, can be automatically set to the same color as that of the node to which the wire is connected, while the color can then be independently changed for each wire which state can be maintained even when the color of the node is changed. Thus, it is possible to easily perform an intuitive display in which the wires are kept in a state easily identifiable for each of the kinds of nodes to which the wires are connected at the beginning, and also using the color for each wire which the user has set as required.

THIRD OPERATION EXAMPLE

FIG. 13

Figure 13:
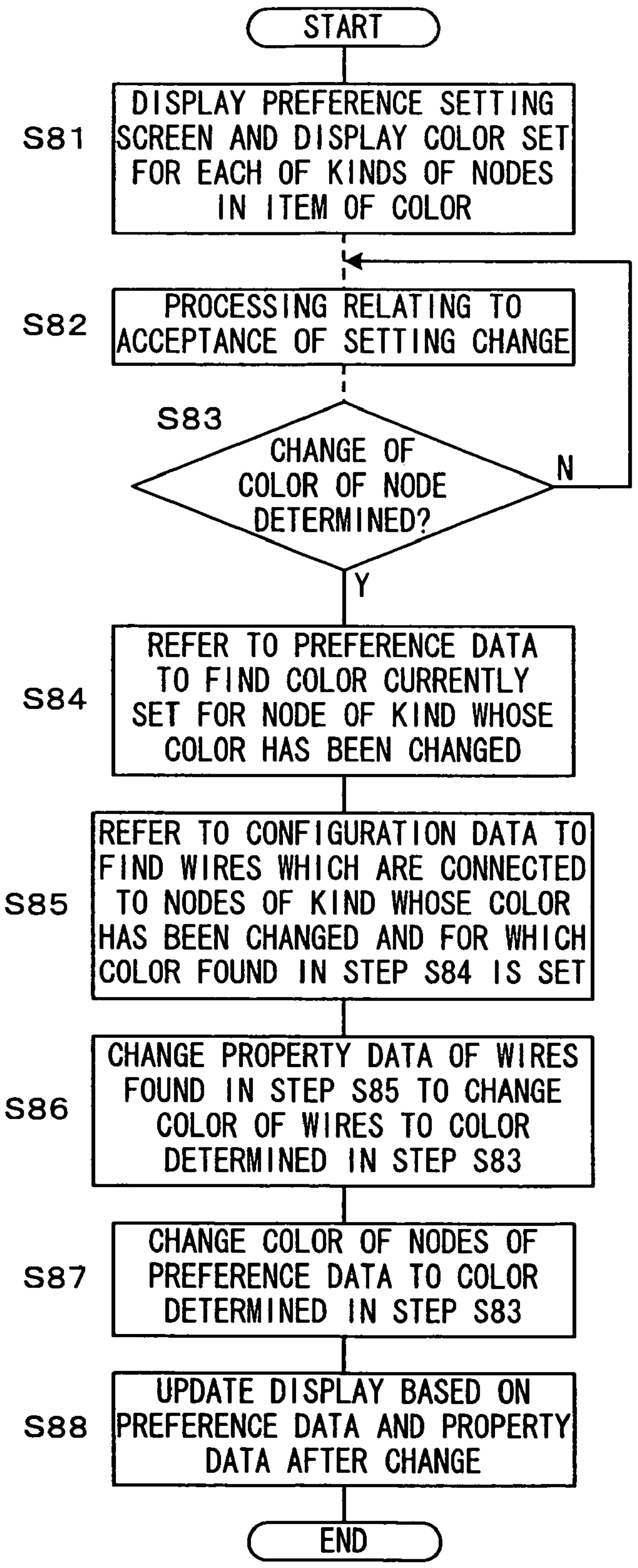
FIG. 13 is a flowchart of processing executed by the same PC when the color of a node is changed in the third operation example.

Further, a flowchart of processing when the color of a node is changed in the third operation example is shown in FIG. 13.

In the third operation example, when directed to display the preference setting screen, the CPU 11 starts the processing shown in the flowchart in FIG. 13. The CPU 11 pop-up displays the preference setting screen as in the steps S51 to S53 in FIG. 10, and accepts the setting change in the preference, and when detecting an operation of determining the change of the color of a node, the CPU 11 proceeds to the processing relating to color change of the node in and after step S84 (S81 to S83).

In this processing, the CPU 11 first refers to the preference data to find the color currently set (before change) for the node of the kind whose color has been changed (S84). The CPU 11 then refers to the configuration data to find wires which are connected to nodes of the kind whose color has been changed and for which the color found in step S84 is set (S85).

The CPU 11 then changes the property data of the wires found in step S85 to change the color of the wires to the color of the connection destination node determined in step S83 (S86). Then, the CPU 11 changes the preference data to change the color of the nodes to the color determined in step S83 (S87), and updates the display based on the preference data and the property data after the change made by the processing to this step (S88), and ends the processing.

In the above processing, the CPU 11 functions as the first and second display controllers in step S88.

In the third operation example, with the above-described processing, when there is a direction to change the color for each of the kinds of nodes, the colors of the wires which are connected to the nodes of that kind and have the same colors as those of their connection destinations are changed in conformity to the change at the nodes.

This configuration makes it possible to remain the color setting of the wire which the user has individually performed, while automatically changing the color of the wire whose color has been automatically set at the time of placement and not especially changed by the user, in conformity to the color change of its connection destination node. Thus, in addition to the effect of the second operation example, there is another effect of allowing display to be performed in which the correspondence between the wires and nodes can be easily recognized while respecting the setting which the user has individually performed, without increasing the labor of any operation.

Note that the processing when the color of a node is changed in the third operation example is the same as that of the second operation example.

MODIFIED EXAMPLES

The description of the embodiments is completed, and it is needless to say that the configuration of the apparatus, the concrete processing contents, the display contents on the screen, and so on are not limited to those described in the above embodiments.

For example, while embodiments in which one item of display styles including color is set have been described in the above-described embodiments, setting relating to combinations of a plurality of items from among color, thickness, pattern, shape and so on, may be treated similarly to the above-described embodiments.

Further, in the case where the display style of a kind of nodes is changed in response to the direction to change the display style of a wire and vice versa, the correspondence and the corresponding rules of the display style may be previously defined instead of bringing the display styles of the wire and the node into completely the same, so that a display styles according to the correspondence and the corresponding rules may be employed. Examples of the above include discriminating the node whose pattern is difficult to be recognized because of its small size through use of the thickness of the contour line, while discriminating the wire using its line pattern such that a thick line corresponds to a sold line and a thin line corresponds to a broken line, and the like.

While the embodiments in which the display style of the node is set by the preference data for each kind has been described in the above embodiments, property data corresponding to the node may be prepared so that the display style can be set for each node.

As a matter of course, it is also adoptable to allow the user to select as required the operation relating to the first to third operation examples in the above described embodiments so as to cause the CPU 11 to execute the operation.

Further, the controller of the invention is not limited to a PC, but may be a dedicated controller that controls the mixer engine, or the mixer engine itself. More than that, the controller need not be an apparatus that controls some external apparatuses as long as the apparatus controls the display on the edit screen. The contents to be edited on the edit screen are not limited to the configuration of signal processing executed by the audio signal processor as long as the contents are edited using the components having respective nodes and wires connecting the nodes. For example, the controller is also applicable to an apparatus for controlling the display on the edit screen for editing the progress schedule or the like.

Further, the above-described program of the invention is stored in the HDD of the PC 10 and so on in advance, and the same effect can be obtained also by providing the program recorded on a non-volatile recording medium (memory) such as a CD-ROM, a flexible disc, or the like and causing the CPU to load for executing the program from the memory to the RAM of the PC 10 or by causing the CPU to download for execution from an external device including a recording medium recording the program thereon or from an external device storing the program in a memory such as an HDD or the like.

As is clear from the above description, the controller of the invention can intuitively display nodes and wires using a plurality of display styles while maintaining the high operability, on the edit screen for performing edit using components each having nodes and wires connecting the nodes. Further, the program of the invention enables the computer to function as the controller so as to obtain the same effect.

Thus, according to the invention, an environment allowing an efficient edit on the edit screen can be provided.

What is claimed is:

1. A controller apparatus for controlling display on a screen for editing a signal processing configuration, wherein the screen graphically represents a plurality of components each having terminal nodes and wires connecting terminal nodes, which constitute the signal processing configuration, each of the terminal nodes being one of a plurality of kinds of terminal nodes, wherein kinds of the terminal nodes are classified depending on a kind of a signal inputted to/outputted from the terminal node or a standard of the terminal node, and wherein the same setting contents about display style set for each of the kinds of the terminal nodes are applied to the terminal nodes provided at all of the components represented on the screen, wherein one kind of the terminal nodes is set with a current display style, said controller apparatus comprising:

a first display controller that performs display of each of the terminal nodes being represented in a display style set for each of the kinds of the terminal nodes;

a second display controller that performs display of each of the wires being represented in a display style set for each of the wires;

a wire adder that adds, when there is an instruction to add a wire, a wire according to the instruction and sets a display style of the added wire based on a display style set for a kind of a predetermined terminal node to which the added wire is connected so that the added wire is also represented on the screen in the set display style;

a first style changer that i) changes, when there is an instruction to change a display style for the one kind of the terminal nodes from the current display style to a changed terminal node display style, the display style for the one kind of the terminal nodes according to the instruction, and ii) changes a display style of a wire, the wire a connected to the one kind of the terminal nodes and b) set with a display style corresponding to the current display style, based on the changed terminal node display style; and a second style changer that changes, when there is an instruction to change a display style of a predetermined wire, the display style of the predetermined wire according to the instruction.

2. The controller apparatus according to claim 1, wherein a memory that stores, for each of the displayed wires represented on the screen, wiring data including information on a display style of a wire is provided, wherein said second display controller is a device that displays each of the wires being represented based on the wiring data, and wherein when there is an instruction to add a wire, said wire adder generates wiring data about the wire to be added.

3. A controller apparatus for controlling display on a screen for editing a signal processing configuration, wherein the screen graphically represents a plurality of components each having terminal nodes and wires connecting terminal nodes, which constitute the signal processing configuration, each of the terminal nodes being one of a plurality of kinds of terminal nodes, wherein kinds of the terminal nodes are classified depending on a kind of a signal inputted to/outputted from the terminal node or a standard of the terminal node, and wherein the same setting contents about a display style set for each of the kinds of the terminal nodes are applied to the terminal nodes provided at all of the components represented on the screen, said controller comprising:

a first display controller that performs display of each of the terminal nodes being represented in a display style set for each of the kinds of the terminal nodes;

a second display controller that performs display of each of the wires being represented in a display style set for each of the wires; and a style changer that i) changes, when there is an instruction to change a display style of a predetermined wire to a changed wire display style, the display style of the predetermined wire according to the instruction, ii) changes a display style for a kind of a predetermined terminal node to which the predetermined wire is connected based on the changed wire display style, and iii) changes display styles of other wires connected to the same kind of terminal node as a kind of the predetermined terminal node based on the changed wire display style.

4. The controller apparatus according to claim 3, wherein a memory that stores, for each of the displayed wires represented on the screen, wiring data including information on a display style of a wire is provided, wherein said second display controller is a device that displays each of the wires being represented based on the wiring data, and wherein when there is an instruction to add a wire, said wire adder generates wiring data about the wire to be added.

5. A non-transitory computer readable storage medium embedding a program containing program instructions executable by a computer for causing the computer to function as a controller apparatus for controlling display on a screen for editing a signal processing configuration, wherein the screen graphically represents a plurality of components each having terminal nodes and wires connecting terminal nodes, which constitute the signal processing configuration, each of the terminal nodes being one of a plurality of kinds of terminal nodes, wherein kinds of the terminal nodes are classified depending on a kind of a signal inputted to/outputted from the terminal node or a standard of the terminal node, and wherein the same setting contents about display style set for each of the kinds of the terminal nodes are applied to the terminal nodes provided at all of the components represented on the screen, wherein one kind of the terminal nodes is set with a current display style, said program causing the computer to execute:

a first display control process of each of the terminal nodes being represented in a display style set for each of the kinds of the terminal nodes;

a second display control process of performing display of each of the wires being represented in a display style set for each of the wires;

a wire add process of adding, when there is an instruction to add a wire, a wire according to the instruction and sets a display style of the added wire based on a display style set for a kind of a predetermined terminal node to which the added wire is connected so that the added wire is also represented on the screen in the set display style;

a first style change process of i) changing, when there is an instruction to change a display style for the one kind of the terminal nodes from the current display style to a changed terminal node display style, the display style for the one kind of the terminal nodes according to the instruction, and ii) changing a display style of a wire, the wire a) connected to the one kind of the terminal nodes and b) set with a display style corresponding to the current display style, based on the changed terminal node display style; and a second style change process of changing, when there is an instruction to change a display style of a predetermined wire, the display style of the predetermined wire according to the instruction.

6. A non-transitory computer readable storage medium embedding a program containing program instructions executable by a computer for causing the computer to function as a controller apparatus for controlling display on a screen for editing a signal processing configuration, wherein the screen graphically represents a plurality of components each having terminal nodes and wires connecting terminal nodes, which constitute the signal processing configuration, each of the terminal nodes being one of a plurality of kinds of terminal nodes, wherein kinds of the terminal nodes are classified depending on a kind of a signal inputted to/outputted from the terminal node or a standard of the terminal node, and wherein the same setting contents about a display style set for each of the kinds of the terminal nodes are applied to the terminal nodes provided at all of the components represented on the screen, said program causing the computer to execute:

a first display control process of performing display of each of the terminal nodes being represented in a display style set for each of the wires;

a second display control process of performing display of each of the wires being represented in a display style set for each of the wires; and a style change process of i) changing, when there is an instruction to change a display style of a predetermined wire to a changed wire display style, the display style of the predetermined wire according to the instruction, ii) changing a display style set for a kind of a predetermined terminal node to which the predetermined wire is connected based on the changed wire display style, and iii) changing display styles of other wires connected to the same kind of terminal node as a kind of the predetermined terminal node based on the changed wire display style.

* * * * *